United States Patent
Liang et al.

(10) Patent No.: US 9,280,282 B2
(45) Date of Patent: Mar. 8, 2016

(54) TOUCH UNLOCKING METHOD AND APPARATUS, AND ELECTRONIC DEVICE

(71) Applicant: Huawei Technologies Co., LTD, Shenzhen (CN)

(72) Inventors: Chenghui Liang, Hangzhou (CN); Chao Ruan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 153 days.

(21) Appl. No.: 13/896,127

(22) Filed: May 16, 2013

(65) Prior Publication Data

US 2013/0321305 A1     Dec. 5, 2013

Related U.S. Application Data

(63) Continuation of application No. PCT/CN2012/084137, filed on Nov. 6, 2012.

(30) Foreign Application Priority Data

May 30, 2012    (CN) .......................... 2012 1 0172580

(51) Int. Cl.
  *G06F 3/0488*    (2013.01)
(52) U.S. Cl.
  CPC ................................. *G06F 3/04883* (2013.01)
(58) Field of Classification Search
  USPC ........................................................ 345/173
  See application file for complete search history.

(56) References Cited

U.S. PATENT DOCUMENTS

| 2008/0263445 | A1* | 10/2008 | Park ...................... G06F 3/0482 715/702 |
| 2009/0284482 | A1 | 11/2009 | Chin |
| 2010/0099394 | A1 | 4/2010 | Hainzl |
| 2010/0306693 | A1 | 12/2010 | Brinda |
| 2011/0080359 | A1* | 4/2011 | Jang et al. ...................... 345/173 |
| 2012/0133484 | A1* | 5/2012 | Griffin .................... G06F 21/51 340/5.54 |

FOREIGN PATENT DOCUMENTS

| CN | 101291496 A | 10/2008 |
| CN | 101308440 A | 11/2008 |
| CN | 101566907 A | 10/2009 |
| CN | 101644991 A | 2/2010 |

(Continued)

OTHER PUBLICATIONS

Chinese Office Action received in Application No. 201210172580.3, mailed Nov. 15, 2013, 12 pages.

(Continued)

*Primary Examiner* — Nalini Mummalaneni
*Assistant Examiner* — Robert Michaud
(74) *Attorney, Agent, or Firm* — Slater & Matsil, L.L.P.

(57) ABSTRACT

A touch unlocking method includes obtaining position information of a plurality of touch points on a device screen in response to sliding of a touch medium on the device screen. A value that reflects a change of a distance between touch points of the plurality of touch points is monitored when the plurality of touch points are located in plurality of touch areas on the device screen respectively. The unlocking control on the device screen is performed according to a result of a comparison between the value that reflects the change of the distance between the touch points and a distance change threshold.

11 Claims, 9 Drawing Sheets

(56) References Cited

FOREIGN PATENT DOCUMENTS

| | | | |
|---|---|---|---|
| CN | 101943993 | A | 1/2011 |
| CN | 102043587 | A | 5/2011 |
| CN | 102253803 | A | 11/2011 |
| CN | 102722331 | A | 10/2012 |
| JP | 2011197860 | A | 10/2011 |

OTHER PUBLICATIONS

Chinese Office Action received in Application No. 201210172580.3 mailed Apr. 24, 2014, 18 pages.

Written Opinion and International Search Report received in Application No. PCT/CN2012/084137 mailed Feb. 14, 2013, 10 pages.

* cited by examiner

TOUCH UNLOCKING METHOD AND APPARATUS, AND ELECTRONIC DEVICE

CROSS-REFERENCE TO RELATED APPLICATIONS

This application is a continuation of International Application No. PCT/CN2012/084137, filed on Nov. 6, 2012, which claims priority to Chinese Patent Application No. 201210172580.3, filed on May 30, 2012, both of which are hereby incorporated by reference in their entireties.

TECHNICAL FIELD

The present invention relates to communication technologies, and in particular, to a touch unlocking method and apparatus, and an electronic device.

BACKGROUND

Multitouch is a technology implemented jointly by man-machine interaction and a hardware device. It is an interactive operation mode for multiple points or multiple users on one display interface. The multitouch discards the single-point operation mode adopted by traditional input devices such as a mouse and a keyboard. A user can use two hands to touch multiple points or touch the screen by using different hand motions including click, double-click, translation, press, roll, and rotation to implement the intended operation and control. Thereby, the user gains more complete features in terms of text, video, image, three-dimension simulation information of an object. In a touch screen-equipped device, screen locking is performed mainly to prevent misoperation caused by non-active use of the device and unlocking is the first step for a user to get ready to use the device.

A touch screen unlocking method in the prior art is to slide on the screen through a single touch point to unlock. FIG. 1a, FIG. 1b, and FIG. 1c are schematic diagrams of an unlocking process of the touch screen unlocking method in the prior art. As shown in FIG. 1a, FIG. 1b, and FIG. 1c, an unlocking slide block is displayed on the touch screen, and when it is detected that a user moves the unlocking slide block along a preset prompt path to a preset destination position through a touch action, the device screen is unlocked; and otherwise, the screen is kept in a locked state. This method is easy to operate.

However, because the unlocking method in the prior art is easy to operate, the screen is easy to be unlocked by an unintended touch of the user. The device is therefore not properly protected.

SUMMARY OF THE INVENTION

Embodiments of the present invention provide a touch unlocking method and apparatus, and an electronic device, which somehow reduce the probability of unintended unlocking of a device.

In one aspect, an embodiment of the present invention provides a touch unlocking method, for unlocking a device screen that is in a locked state. The device screen is in the locked state has a lock area including a plurality of touch areas. The method includes obtaining position information of a plurality of touch points on the device screen in response to sliding of a touch medium on the device screen; monitoring a value that reflects a change of a distance between touch points of the plurality of touch points when the plurality of touch points are located in the plurality of touch areas on the device screen respectively; and performing unlocking control on the device screen according to a result of a comparison between the value that reflects the change of the distance between the touch points and a distance change threshold.

In another aspect, an embodiment of the present invention provides a touch unlocking apparatus, for unlocking a device screen that is in a locked state. The device screen that is in the locked state has a lock area including plurality of touch areas. The apparatus includes an obtaining module, which is configured to obtain position information of a plurality of touch points on the device screen in response to sliding of a touch medium on the device screen; a monitoring module, which is configured to monitor a value that reflects a change of a distance between touch points of the plurality of touch points when the plurality of touch points are located in the plurality of touch areas on the device screen respectively; and an unlocking control module, which is configured to perform unlocking control on the device screen according to a result of a comparison between the value that reflects the change of the distance between the touch points and a distance change threshold.

In still another aspect, an embodiment of the present invention provides an electronic device, including a device screen and a processing module. The processing module is connected to the device screen. The device screen is configured to display a screen state of the electronic device before unlocking, a screen state of the electronic device during unlocking, or a screen state of the electronic device after unlocking. The screen state of the electronic device before unlocking include plurality of touch areas displayed in a lock area on the device screen. The device screen is further configured to sense sliding of a touch medium at touch points on the device screen and to send a response signal to the processing module.

The processing module is configured to receive the response signal sent by the device screen, to obtain position information of a plurality of touch points on the device screen according to the response signal, to monitor a value that reflects a change of a distance between touch points of the plurality of touch points when the plurality of touch points are located in the plurality of touch areas on the device screen respectively, and to perform unlocking control on the device screen according to a result of a comparison between the value that reflects the change of the distance between the touch points and a distance change threshold.

The technical effects of the embodiments of the present invention are as follows. The position information of a plurality of touch points on the device screen is obtained in response to sliding of a touch medium on the device screen, and when the plurality of touch points are located in a plurality of touch areas on the device screen respectively, the value that reflects the change of the distance between the touch points of the plurality of touch points is monitored and the unlocking control is performed on the device screen according to the result of comparison between the value that reflects the change of the distance between the touch points and the distance change threshold. The embodiments of the present invention overcome the unintended unlocking easily caused by the adoption of single point touch in the prior art and somehow reduce the probability of unintended unlocking of a device.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 2:
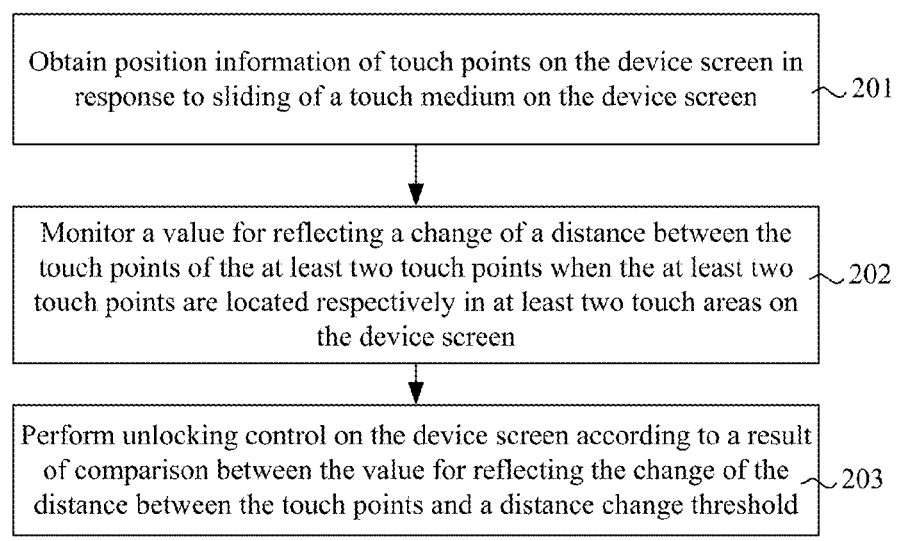
FIG. 2 is a flowchart of a touch unlocking method according to Embodiment 1 of the present invention.

FIG. 2 is a flowchart of a touch unlocking method according to Embodiment 1 of the present invention. As shown in FIG. 2, this embodiment provides a touch unlocking method, used to unlock a device screen that is in a locked state, where the device screen that is in the locked state has a lock area including at least two touch areas. The method includes the following steps.

Step 201: Obtain position information of touch points on the device screen in response to sliding of a touch medium on the device screen, where the number of touch points is at least two.

This embodiment is based on the multitouch technology adopted by touch screen-equipped devices in the current market. When a user touches multiple points on the device screen, multiple touch points are active on the device screen, thereby avoiding unintended unlocking caused by the adoption of single-point touch. This step is to obtain position information of touch points on the device screen in response to the slide, of a touch medium on the device screen, along any trail in any direction when the device detects that the user touches the device screen. The touch points here are points generated on the device screen when the user touches the device screen and the number of the touch points is at least two. In this embodiment, multiple touch points may be detected on the device screen. The position information, of the touch points, obtained in this step may be coordinate information of the touch points on the device screen.

Step 202: Monitor a value for reflecting a change of a distance between touch points of the at least two touch points when the at least two touch points are located in at least two touch areas on the device screen respectively.

In this embodiment, a precondition of screen unlocking control is that at least two touch areas can be generated and displayed on the device screen in advance. The at least two touch areas are drawn and generated according to an area design policy. The at least two touch areas are displayed in the lock area on the device screen and the display positions of the at least two touch areas are updated according to the slide positions of the at least two touch points. The touch area may be a graphic area, a text area, or areas in other forms. In the case of a graphic area, the area may be any graph and in any shape, and the size of the touch area is not limited. To help the user unlock the device screen, related unlocking prompt information may be displayed in the positions of the preset multiple touch areas. The unlocking prompt information may be presented in form of text, image, video, or flash, or any combination thereof. When the touch points are located in at least two touch areas on the device screen respectively, that is, when multiple touch points are located in multiple touch areas respectively when the user touches multiple points on the device screen, the device starts to monitor the value for reflecting the change of the distance between the touch points of the at least two touch points, that is, to calculate the value for reflecting the change of the distance between each two touch points. When two touch areas are preset on the device screen, this step is to monitor the value for reflecting the change of the distance between the two touch points located in the two touch areas; when more than two touch areas are preset on the device screen, this step is to monitor the value for reflecting the change of the distance between any two touch points of the multiple touch points in the multiple touch areas. This embodiment implements real-time monitoring of the value for reflecting the change of the distance between touch points in all touch areas and thereby performs unlocking control on the device screen accurately according to the operation of the user.

Step 203: Perform unlocking control on the device screen according to a result of a comparison between the value for reflecting the change of the distance between the touch points and a distance change threshold.

After the distance between the touch points is obtained by calculation, the device may perform unlocking control on the device screen according to the result of comparison between the value for reflecting the change of the distance between the touch points and a distance change threshold. The unlocking control here is specifically unlocking the device screen or keeping the device screen in a locked state. Specifically, in this step, the device may obtain the change of the distance between two same touch points according to the monitored value for reflecting the change of the distance between the touch points in the foregoing step, and decides whether to unlock the device screen according to the result of comparison between the value for reflecting the change of the distance between the touch points and the distance change threshold. The value for reflecting the change of the distance is the value of the change of the distance between two touch points. It is the absolute value of a difference between the distances between the two touch points at different time points and reflects the change of the distance between the two touch points at different time points. When two touch areas are preset on the device screen, the device may perform unlocking control on the device screen according to the result of comparison between the value for reflecting the change of the distance between only two touch points in the two touch areas and the distance change threshold. For example, when the value for reflecting the change of the distance reaches the distance change threshold, the device unlocks the device screen; and when the value for reflecting the change of the distance does not reach the distance change threshold, the device does not unlock the device screen.

As seen from the above description, this embodiment provides a touch unlocking method. The position information of at least two touch points on the device screen is obtained in response to sliding of a touch medium on the device screen along any trail in any direction, and when the at least two touch points are located in at least two touch areas on the device screen respectively, the value for reflecting the change of the distance between the touch points of the at least two touch points is monitored and the unlocking control is performed on the device screen according to the result of comparison between the value for reflecting the change of the distance between the touch points and the distance change threshold. This embodiment overcomes the unintended unlocking easily caused by the adoption of single point touch in the prior art and somehow reduces the probability of unintended unlocking of a device.

Compared with the unlocking by sliding along a preset trail in the prior art, the embodiment of the present invention can implement unlocking by sliding along any trail in any direction; compared with the single point touch unlocking and restricted destination area of sliding in the prior art, in the embodiment of the present invention, unlocking is only activated by the simultaneous functioning of multiple points and the destination of sliding is not restricted to a fixed area or direction.

Figure 3:
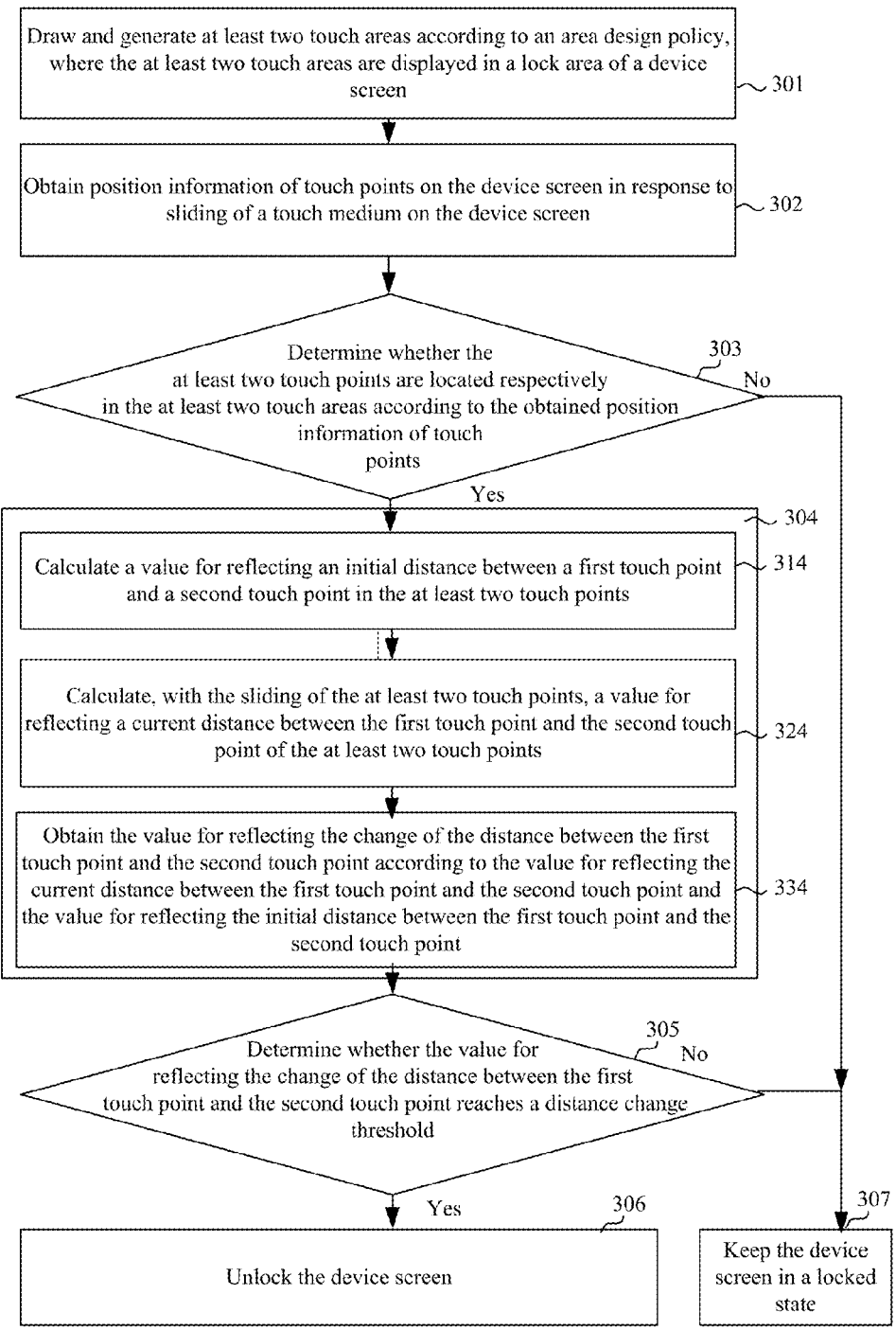
FIG. 3 is a flowchart of a touch unlocking method according to Embodiment 2 of the present invention.

FIG. 3 is a flowchart of a touch unlocking method in Embodiment 2 of the present invention. As shown in FIG. 3, this embodiment provides a touch unlocking method, including the following steps.

Step 301: Draw and generate at least two touch areas according to an area design policy, where the at least two touch areas are displayed in a lock area on a device screen.

It should be understood that, in one implementation scheme, the touch areas displayed in the lock area on a device screen that is in a locked state may be preset. The positions of the at least two touch areas set here may be any position on the device screen (that is, the touch screen) and specifically may be set according to the practical application and needs.

In another implementation scheme, the touch areas displayed in the lock area on the device screen that is in the locked state are generated dynamically. In this embodiment, before the device screen is unlocked, at least two touch areas may be drawn and generated according to an area design policy, where the at least two touch areas are displayed in the lock area on the device screen. The positions of the at least two touch areas drawn and generated here may be any position of the device screen (that is, the touch screen) and specifically may be set according to the practical application and needs. The area design policy may be a preset policy or a policy dynamically obtained. For example, a policy dynamically configured by the user is obtained through a man-machine interaction interface, or the corresponding area design policy is read from a policy database through a communication interface. It should be understood that the policy database is communicatively connected to the body which performs the method of the present invention (such as an electronic device). Moreover, in this embodiment, the positions where the at least two touch areas are displayed on the device screen are updated according to the sliding positions of at least two touch points. That is, the display positions, on the device screen, of the touch areas where the touch points are located are continuously updated with the sliding of the touch points.

The touch area in this embodiment may be any graph, in any shape, and displayed in any position on the device screen, and the size of a touch area is not limited. To help the user unlock the device screen, related unlocking prompt information may be set in the positions of the preset multiple touch areas. The unlocking prompt information may be presented in form of text, image, video, or flash, or any combination thereof.

Step 302: Obtain position information of touch points on the device screen in response to sliding of a touch medium on the device screen.

When the user touches the device screen, the device detects the touch points generated, on the device screen, because of the touch action. This step is to obtain position information of touch points on the device screen in response to sliding of the touch medium on the device screen along any trail in any direction. This step may be similar to the foregoing step 201. It should be understood that the positions of the touch points on the screen may be any position on the touch screen. That the user touches the device screen may be a process from when a touch medium touches the device screen to when all touch media leave the device screen, where the touch medium may be any object that is fit for operating the device screen, such as a finger or a pen stylus.

Step 303: Determine whether the at least two touch points are located in at least two touch areas respectively according to the obtained position information of touch points. If yes, step 304 is performed; otherwise, step 307 is performed.

After the device obtains the position information of the touch points, the device may determine whether at least two touch points are located in the at least two touch areas set in step 301 respectively according to the obtained position information. That is, the device determines whether there is a touch point located in each touch area. If yes, step 304 is performed to proceed to the subsequent unlocking operation; otherwise, step 307 is performed to keep the device screen in a locked state.

Step 304: Monitor, with the sliding of the at least two touch points, the value for reflecting the change of the distance between the touch points of the at least two touch points.

When at least two touch points are located in at least two touch areas respectively, the device may monitor, with the sliding of the at least two touch points, the value for reflecting the change of the distance between the touch points located in the touch areas. Specifically, if two touch areas are displayed on the device screen, in this step, when two touch points are located in the two touch areas of the device screen respectively, the device monitors, with the sliding of the two touch points, the value for reflecting the change of the distance between the two touch points located in the two touch areas; if more than two touch areas are displayed on the device screen, in this step, when at least two touch points are located in at least two touch areas respectively, the device monitors, with the sliding of the at least two touch points, the value for reflecting the change of the distance between any two touch points of the multiple touch points in the multiple touch areas. This embodiment implements real-time monitoring, with the sliding of the at least two touch points, of the value for reflecting the change of the distance between touch points in all touch areas and thereby performs unlocking control on the device screen accurately according to the operation of the user.

Specifically, the foregoing step 304 in this embodiment may include the following steps.

Step 314: Calculate a value for reflecting an initial distance between a first touch point and a second touch point in the at least two touch points.

When calculating the value for reflecting the change of the distance between touch points of the at least two touch points, the device may calculate the initial distance between a first touch point and a second touch point of the at least two touch points before the positions of the touch points on the device screen change. The value for reflecting the initial distance is a value of the distance between the two touch points when the two touch points initially are located in two touch areas respectively. The first touch point and the second touch point are respectively touch points that are located in any two different touch areas of the at least two touch areas. The first touch point and the second touch point are not two specific touch points but any two touch points without specific meaning and just for clear explanation of the technical solutions of the present invention.

Step 324: Calculate, with the sliding of the at least two touch points, a value for reflecting a current distance between the first touch point and the second touch point of the at least two touch points.

In this embodiment, the value for reflecting the current distance between the first touch point and the second touch point of the at least two touch points is calculated with the sliding of the at least two touch points. The value for reflecting the current distance is the value of the distance between the two touch points at the current time. That is, after the multitouch process, the two touch points are still located in two touch areas.

Step 334: Obtain the value for reflecting the change of the distance between the first touch point and the second touch point according to the value for reflecting the current distance between the first touch point and the second touch point and the value for reflecting the initial distance between the first touch point and the second touch point.

In this step, the value for reflecting the change of the distance between the first touch point and the second touch point is further obtained according to the value for reflecting the current distance, between the first touch point and the second touch point, calculated in step 324 and the value for reflecting the initial distance, between the first touch point and the second touch point, calculated in step 314. The value for reflecting the change of the distance may be understood as the absolute value of the difference between the initial distance and the current distance between the first touch point and the second touch point. That is, the change of the distance, between the two touch points, relative to the initial state is obtained after the sliding of the touch points. The change may be an increase or decrease of the distance between the two touch points, reflected by the parting or approaching of the two touch points. In this embodiment, the touch points may slide in any direction, which does not need to be limited.

Step 305: Determine whether the value for reflecting the change of the distance between the first touch point and the second touch point reaches the distance change threshold. If yes, step 306 is performed; otherwise, step 307 is performed.

This step is to determine whether the value for reflecting the change of the change between the first touch point and the second touch point reaches the distance change threshold. If yes, step 306 is performed to unlock the device screen; otherwise, step 307 is performed to keep the device screen in a locked state. The distance change threshold may be preset or obtained dynamically. For example, a distance change threshold dynamically configured by the user is obtained through a man-machine interaction interface or calculated by an application program running on an electronic device according to user habit parameters in operating the electronic device. Persons skilled in the art can understand that, in the embodiment of the present invention, the distance change threshold may be a value or a range. The value of the distance change threshold may be set according to practical application or experience. This means that the distance change threshold may vary in different application scenarios and may be fixed or dynamically changed in one application scenario.

In this embodiment, if only two touch areas are set, the first touch and the second touch point are two touch points located in the two touch areas respectively. Then, in this step, it is only necessary to determine the value for reflecting the change of the distance between the two touch points. If more than two touch areas are set and there are more than two touch points, there may be multiple determination policies to determine whether the screen should be unlocked according to the value for reflecting the change of the distance between the touch points. That is, the determination may be made according to the value for reflecting the change of the distance between one pair touch points or according to the values for reflecting the changes of the distances between multiple pairs of touch points, or according to the values for reflecting the changes of the distances between all touch point pairs formed by every two of all touch points. In the case of the first determination policy, the device screen is unlocked when the value for reflecting the change of the distance between the two touch points reaches the distance change threshold; in the case of the second determination policy, the device screen is unlocked when the values for reflecting the changes of the distances between multiple pairs of touch points all reach the distance change threshold; in the case of the third determination policy, the device screen is unlocked when the values for reflecting the changes of the distances between all touch point pairs all reach the distance change threshold. In this embodiment, because the calculated value for reflecting the current distance may be greater than the value for reflecting the initial distance or smaller than the initial distance, this step may specifically be determining whether the absolute value of the difference between the value for reflecting the current distance and the value for reflecting the initial distance is greater than the distance change threshold.

Step 306: Unlock the device screen.

When the value for reflecting the change of the distance between the first touch point and the second touch point reaches the distance change threshold, the device screen is unlocked. That is, when the absolute value of the difference between the values for reflecting the current distance and initial distance between the first touch point and the second touch point is greater than the distance change threshold, the device screen is unlocked. Because the first touch point and the second touch point may represent any two touch points, the value for reflecting the change of the distance between the first touch point and the second touch point may represent the change of the distance between any tow touch points.

Step 307: Keep the device screen in a locked state.

When the value for reflecting the change of the distance between the first touch point and the second touch point does not reach the distance change threshold, the device screen is kept in the locked state. That is, when the absolute value of the difference between the values for reflecting the current distance and initial distance between the first touch point and the second touch point is smaller than or equal to the distance change threshold, the device screen is kept in the locked state.

Further, the state of the at least two touch areas in this embodiment may change in response to the touch of the user. That is, when the user touches the device screen, the states of the touch areas may change accordingly. The state of a touch area may be the size or shape of the touch area. For example, a seed sprouts and grows into a little tree, or an umbrella changes from being closed to being open.

This embodiment provides a touch unlocking method. The position information of at least two touch points on the device screen is obtained in response to sliding of a touch medium on the device screen, and when the at least two touch points are located in at least two touch areas on the device screen respectively, the value for reflecting the change of the distance between the touch points of the at least two touch points is monitored and the unlocking control is performed on the device screen according to the result of comparison between the value for reflecting the change of the distance between the touch points and the distance change threshold. This embodiment overcomes the unintended unlocking easily caused by the adoption of single point touch in the prior art, somehow reduces the probability of unintended unlocking of a device, and makes the unlocking operation more convenient, more visual, and more interesting.

Compared with the unlocking by sliding along a preset trail in the prior art, the embodiment of the present invention can implement unlocking by sliding along any trail in any direction; compared with the single point touch unlocking and restricted destination area of sliding in the prior art, in the embodiment of the present invention, unlocking is only activated by the simultaneous functioning of multiple points and the destination of sliding is not restricted to a fixed area or direction.

Figure 4:
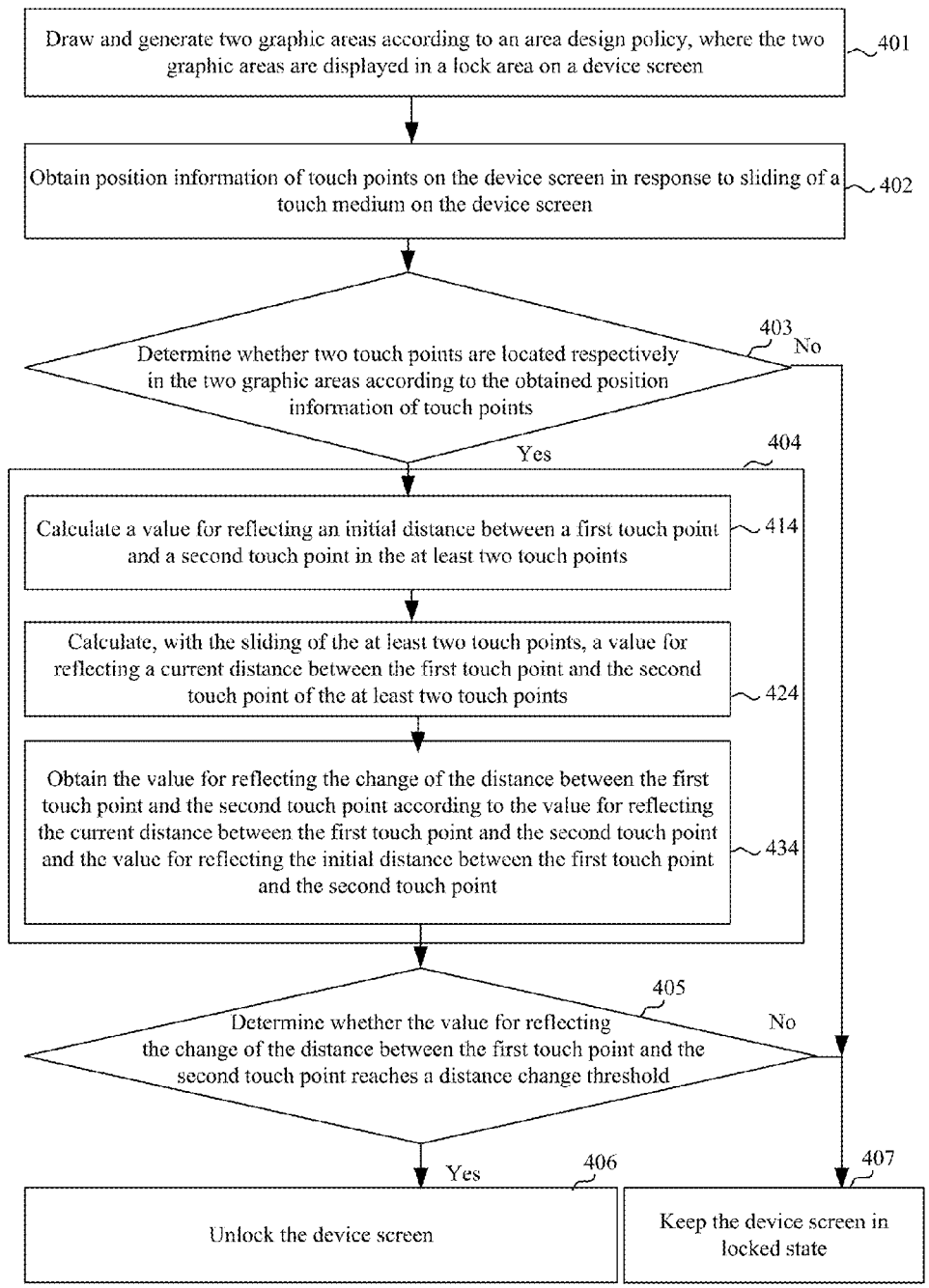
FIG. 4 is a flowchart of a touch unlocking method according to Embodiment 3 of the present invention.

FIG. 4 is a flowchart of a touch unlocking method in Embodiment 3 of the present invention. As shown in FIG. 4, this embodiment provides a touch unlocking method, where a touch area is exemplarily a graphic area. The method includes the following steps.

Step 401: Draw and generate two touch areas according to an area design policy, where the two touch areas are displayed in a lock area on a device screen.

Figure 5A:
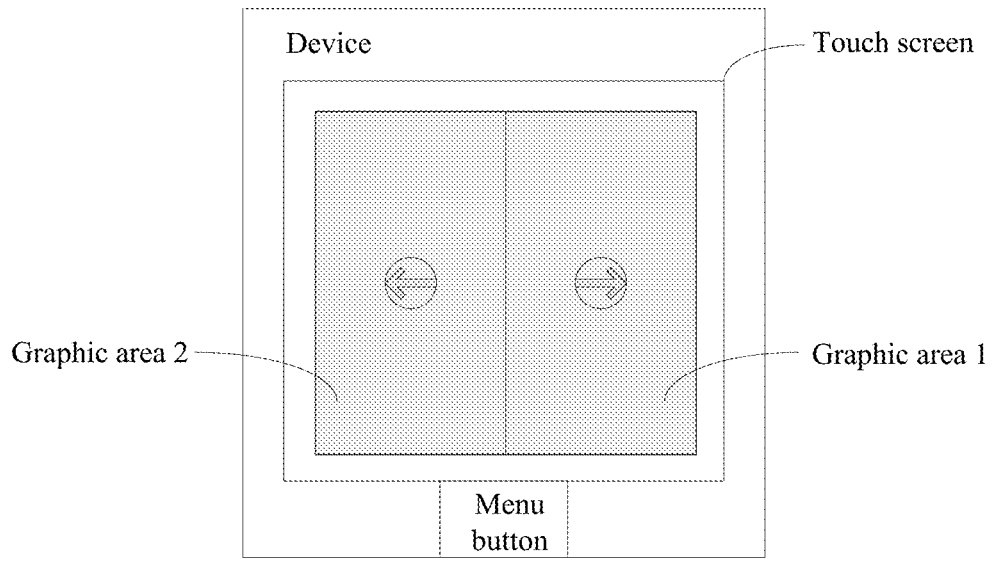
FIG. 5a is a first schematic diagram of an unlocking process of the touch unlocking method according to Embodiment 3 of the present invention.

In this embodiment, it is assumed that two graphic areas are drawn and generated according to an area design policy and displayed on a device screen that is in a locked state, namely, displayed in the lock area on the device screen. FIG. 5a is a first schematic diagram of a touch unlocking process in Embodiment 3 of the present invention. As shown in FIG. 5a, the device screen is in a locked state, where the arrows shown in the figure are designed as unlocking prompt information to prompt the user to unlock the screen. The "graphic area 1" and "graphic area 2" in the figure are two drawn and generated touch areas. In this embodiment, the positions where the two touch areas are displayed on the device screen are updated according to the sliding positions of two touch points. That is, the display positions, on the device screen, of the touch areas where the touch points are located are updated with the sliding of the touch points.

Step 402: Obtain position information of touch points on the device screen in response to sliding of a touch medium on the device screen. This step may be similar to the foregoing step 302 and will not be further described here.

Step 403: Determine whether the two touch points are located in the two graphic areas respectively according to the obtained position information of touch point. If yes, step 404 is performed; otherwise, step 407 is performed.

In this embodiment, as shown in FIG. 5a, two graphic areas are displayed on the device screen. In this step, it is determined whether the two touch points are located in the two graphic areas respectively according to the position information, of touch points, obtained in the foregoing step. If yes, step 304 is performed to proceed to the subsequent unlocking operation; otherwise, step 309 is performed to keep the device screen in a locked state.

Step 404: Monitor, with the sliding of the at least two touch points, the value for reflecting the change of the distance between the first touch point and the second touch point.

When there are touch points located in both graphic areas, the device may monitor the value for reflecting the change of the distance between the two touch points located in the two graphic areas. That is, calculate the value for reflecting the change of the distance between the first touch point and the second touch point. This embodiment assumes that the first touch point is located in the "graphic area 1" shown in FIG. 5a and the second touch point is located in the "graphic area 2" shown in FIG. 5a. In this embodiment, the value for reflecting the change of the distance between two touch points is monitored in real time with the sliding of the at least two touch points and thereby the unlocking control is performed on the device screen accurately according to the operation of the user.

Specifically, the foregoing step 404 in this embodiment may include the following steps.

Step 414: Calculate a value for reflecting an initial distance between the first touch point and the second touch point.

When calculating the value for reflecting the change of the distance between the first touch point and the second touch point, the device may calculate the value for reflecting the initial distance between the first touch point and the second touch point before the positions of the touch points on the device screen change. The value for reflecting the initial distance is the value of the distance between the two touch points when the two touch points are initially located in the two graphic areas respectively.

Step 424: Calculate, with the sliding of the two touch points, the value for reflecting the current distance between the first touch point and the second touch point.

In this embodiment, the value for reflecting the current distance between the first touch point and the second touch point of the two touch points is calculated with the sliding of the two touch points. The value for reflecting the current distance is the current value of the distance between the same two touch points still in the two graphic areas.

Step 434: Obtain the value for reflecting the change of the distance between the first touch point and the second touch point according to the value for reflecting the current distance between the first touch point and the second touch point and the value for reflecting the initial distance between the first touch point and the second touch point. This step is similar to the foregoing step 334 and will not be further described here.

Step 405: Determine whether the value for reflecting the change of the distance between the first touch point and the second touch point reaches the distance change threshold. If yes, step 406 is performed; otherwise, step 407 is performed.

In this embodiment, because only two graphic areas are displayed, it is only necessary in this step to determine the value for reflecting the change of the distance between the two touch areas and specifically determine whether the value for reflecting the change of the distance between the first touch point and the second touch point reaches the distance change threshold. If yes, step 406 is performed to unlock the device screen; otherwise, step 407 is performed to keep the device screen in a locked state.

Step 406: Unlock the device screen.

When the value for reflecting the change of the distance between the first touch point and the second touch point reaches the distance change threshold, the device screen is unlocked. That is, when the absolute value of the difference between the values for reflecting the current distance and initial distance between the first touch point and the second touch point is greater than the distance change threshold, the device screen is unlocked.

Step 407: Keep the device screen in a locked state.

When the value for reflecting the change of the distance between the first touch point and the second touch point does not reach the distance change threshold, the device screen is kept in the locked state. That is, when the absolute value of the difference between the values for reflecting the current distance and initial distance between the first touch point and the second touch point is smaller than or equal to the distance change threshold, the device screen is kept in the locked state.

Figure 1A:
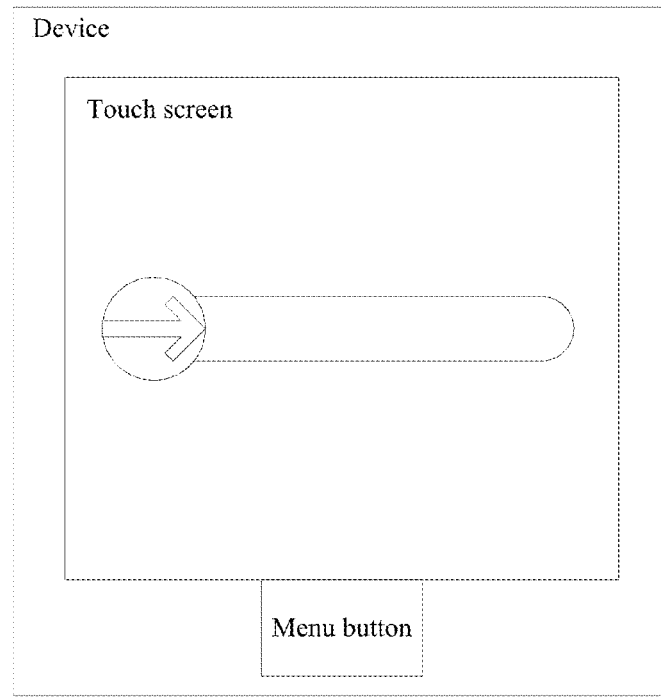
FIG. 1a is a first schematic diagram of an unlocking process of a touch unlocking method in a prior art.
Figure 1B:
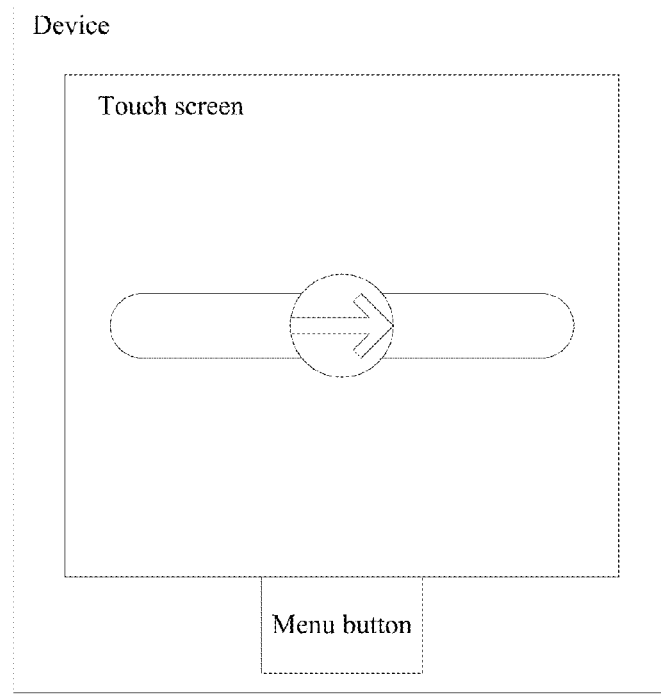
FIG. 1b is a second schematic diagram of an unlocking process of a touch unlocking method in a prior art.
Figure 1C:
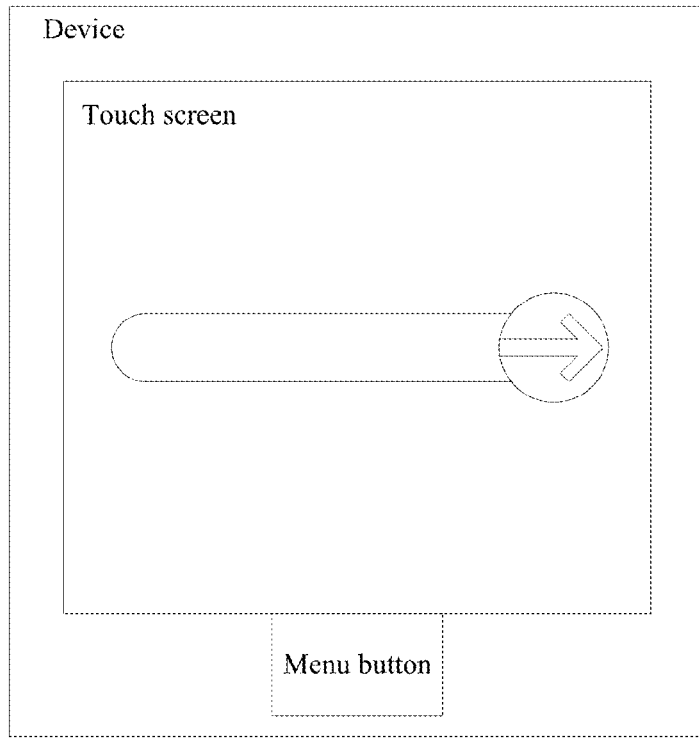
FIG. 1c is a third schematic diagram of an unlocking process of a touch unlocking method in a prior art.
Figure 5B:
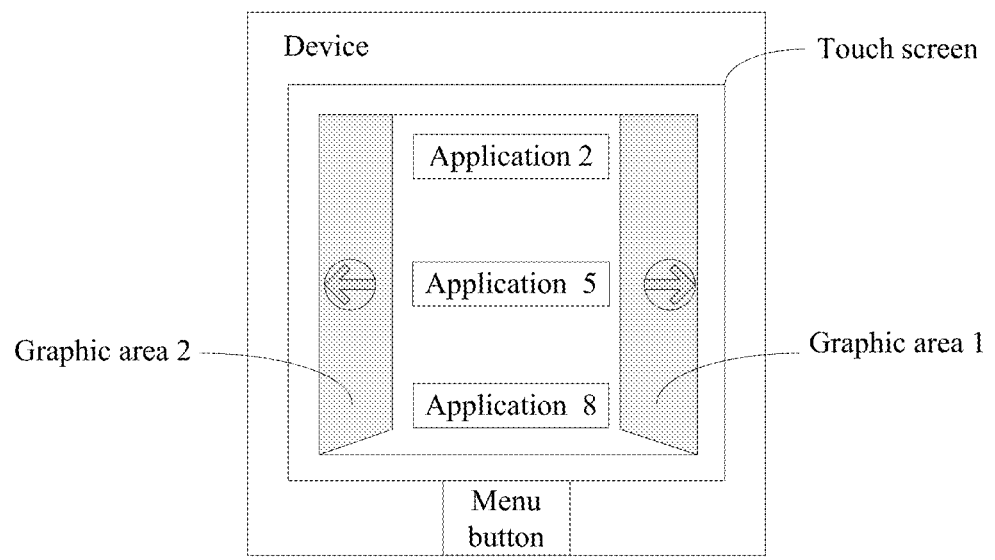
FIG. 5b is a second schematic diagram of an unlocking process of the touch unlocking method according to Embodiment 3 of the present invention.
Figure 5C:
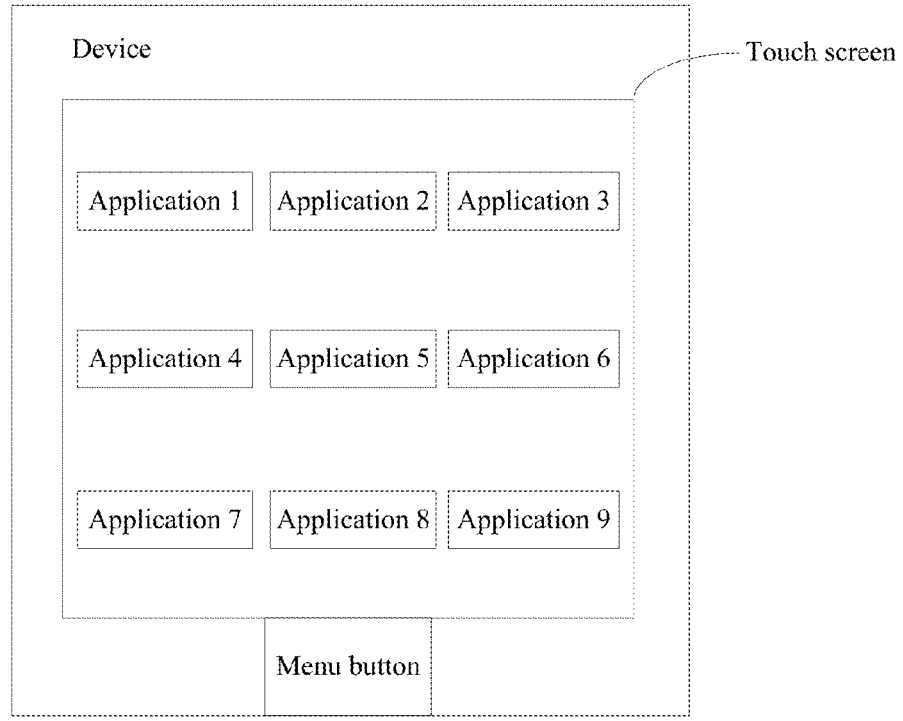
FIG. 5c is a third schematic diagram of an unlocking process of the touch unlocking method according to Embodiment 3 of the present invention.

FIG. 5*b* shows a device screen in an unlocking process. From the figure, it is obvious that the distance between the first touch point and the second touch point is increased gradually from the initial state but the value for reflecting the change of the distance does not reach the distance change threshold, and therefore, the device screen is still in a locked state. FIG. 5*c* shows an unlocked device screen. The unlocked device screen in this embodiment is similar to the locked device screen in the prior art shown in FIG. 1*c*. From the figure, it is obvious that the value for reflecting the change of the distance between the first touch point and the second touch point reaches the distance change threshold, and therefore, the device screen is unlocked.

Figure 6A:
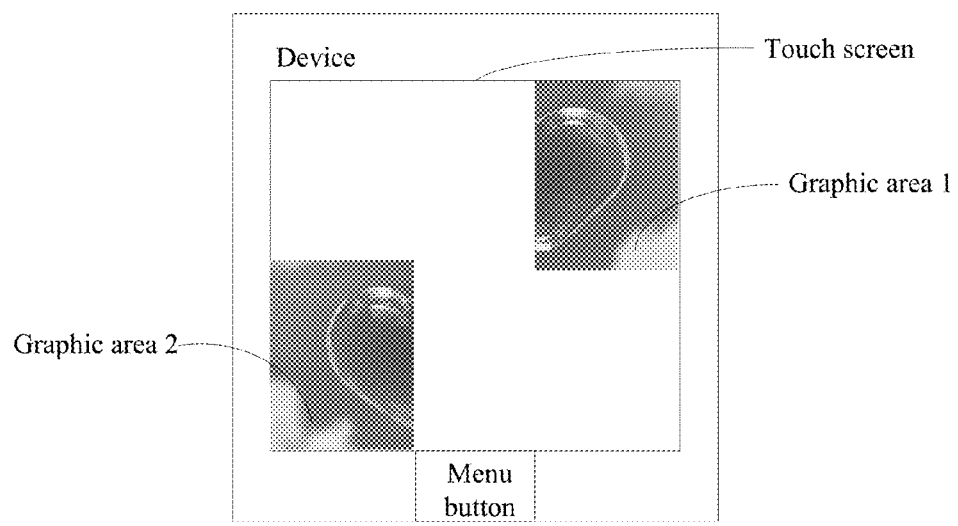
FIG. 6a is a fourth schematic diagram of an unlocking process of the touch unlocking method according to Embodiment 3 of the present invention.
Figure 6B:
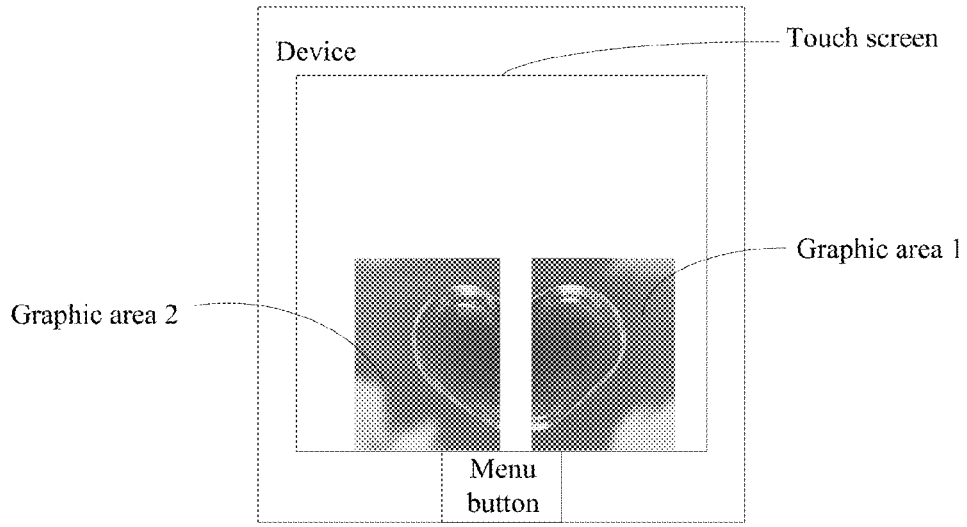
FIG. 6b is a fifth schematic diagram of an unlocking process of the touch unlocking method according to Embodiment 3 of the present invention.
Figure 6C:
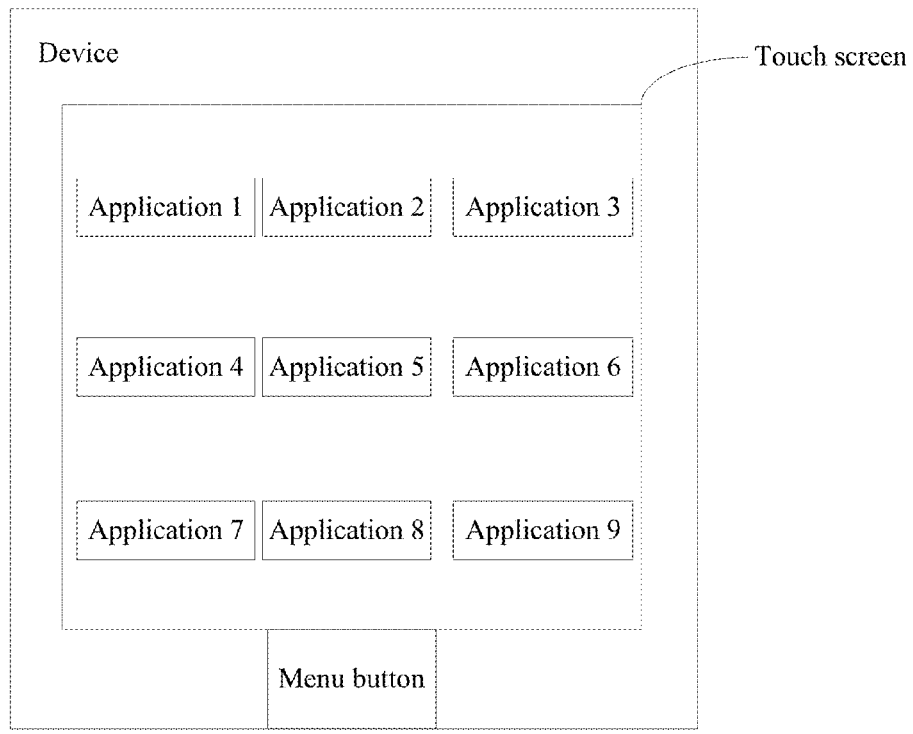
FIG. 6c is a sixth schematic diagram of an unlocking process of the touch unlocking method according to Embodiment 3 of the present invention.

FIGS. 5*a*-5*c* are only an exemplary example of this embodiment, where a scenario where the touch points moves away from each other in a sliding process is described. The distance between the two touch points is increased gradually in the unlocking process and finally, when the value for reflecting the change of the distance is greater than the distance change threshold, the device screen is unlocked. FIGS. 6*a*-6*c* are another exemplary example of this embodiment where two touch points approach each other in a sliding process. As shown in FIG. 6*a*, when the device screen is in a locked state, the distance between two touch points located in the "graphic area 1" and the "graphic area 2" is large; as shown in FIG. 6*b*, when the device screen is in an unlocking process, the distance of the two touch points is gradually smaller but the change of the distance still does not reach the distance change threshold, and therefore, the device screen is still in the locked state. FIG. 6*c* shows an unlocked device screen. The unlocked device screen in this embodiment is similar to the locked device screen in the prior art shown in FIG. 1*c*. From the figure, it is obvious that the change of the distance between the first touch point and the second touch point reaches the distance change threshold, and therefore, the device screen is unlocked.

This embodiment provides a touch unlocking method. The position information of two touch points on the device screen is obtained in response to sliding of a touch medium on the device screen, and when at least two touch points are located in the two graphic areas on the device screen respectively, the value for reflecting the change of the distance between the two touch points is monitored and the unlocking control is performed on the device screen according to the result of comparison between the value for reflecting the change of the distance between the two touch points and the distance change threshold. This embodiment overcomes the unintended unlocking easily caused by the adoption of single point touch in the prior art, somehow reduces the probability of unintended unlocking of a device, and makes the unlocking operation more convenient, more visual, and more interesting.

Compared with the unlocking by sliding along a preset trail in the prior art, the embodiment of the present invention can implement unlocking by sliding along any trail in any direction; compared with the single point touch unlocking and restricted destination area of sliding in the prior art, in the embodiment of the present invention, unlocking is only activated by the simultaneous functioning of multiple points and the destination of sliding is not restricted to a fixed area or direction.

Persons of ordinary skill in the art may understand that all or part of the steps in each of the foregoing method embodiments may be implemented by a program instructing relevant hardware. The program may be stored in a computer readable storage medium. When the program is run, the steps of the forgoing methods in the embodiments are performed. The storage medium includes any medium that is capable of storing program codes, such as a ROM, a RAM, a magnetic disk, or an optical disk.

Figure 7:
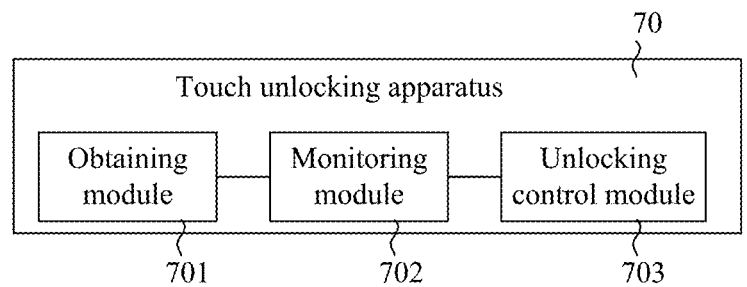
FIG. 7 is a schematic structural diagram of a touch unlocking apparatus according to Embodiment 1 of the present invention.

FIG. 7 is schematic structural diagram of a touch unlocking apparatus in Embodiment 1 of the present invention. As shown in FIG. 7, this embodiment provides a touch unlocking apparatus that can perform all steps in the first method embodiment which will not be further described here. The touch unlocking apparatus provided in this embodiment is configured to unlock a device screen that is in a locked state that has a lock area which includes at least two touch areas. The apparatus 70 may include an obtaining module 701, a monitoring module 702, and an unlocking control module 703.

The obtaining module 701 is configured to obtain position information of touch points on the device screen in response to sliding of a touch medium on the device screen, where the number of touch points is at least two.

The monitoring module 702 is configured to: when the at least two touch points are located in the at least two touch areas on the device screen respectively, monitor the value for reflecting the value for reflecting the change of the distance between touch points of the at least two touch points.

The unlocking control module 703 is configured to perform unlocking control on the device screen according to a result of a comparison between the value for reflecting the change of the distance between the touch points and a distance change threshold.

As can be seen from the above description, this embodiment provides a touch unlocking apparatus, which obtains the position information of at least two touch points on the device screen in response to sliding of a touch medium on the device screen, and when the at least two touch points are located in at least two touch areas on the device screen respectively, monitors the value for reflecting the change of the distance between the touch points of the at least two touch points, and performs unlocking control on the device screen according to the result of comparison between the value for reflecting the change of the distance between the touch points and the distance change threshold. This embodiment overcomes the unintended unlocking easily caused by the adoption of single point touch in the prior art, somehow reduces the probability of unintended unlocking of a device, and makes the unlocking operation more convenient, more visual, and more interesting.

Figure 8:
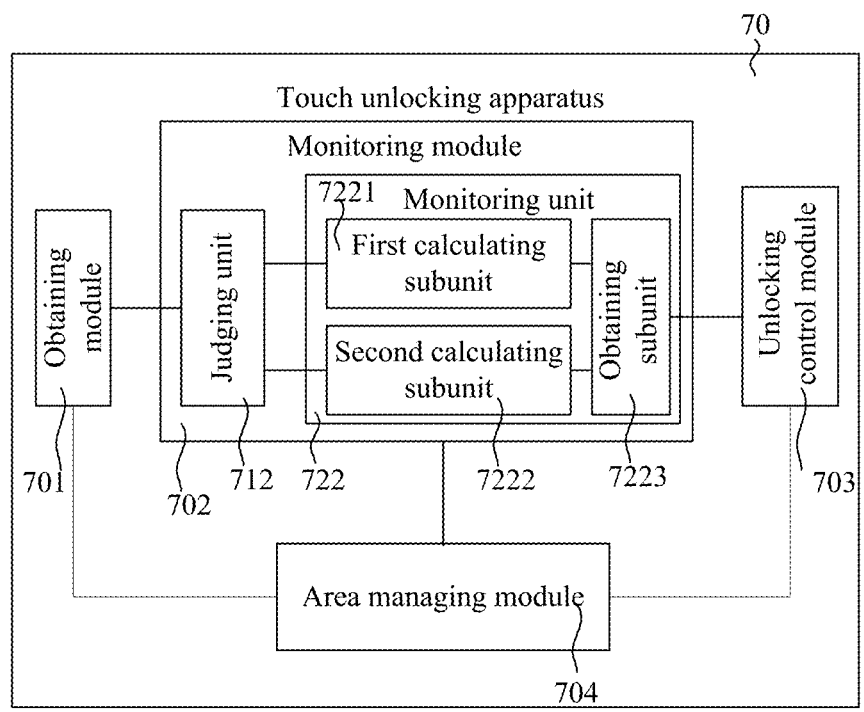
FIG. 8 is a schematic structural diagram of a touch unlocking apparatus according to Embodiment 2 of the present invention.

FIG. 8 is schematic structural diagram of a touch unlocking apparatus in Embodiment 2 of the present invention. As shown in FIG. 8, this embodiment provides a touch unlocking apparatus that can perform all steps in the second or third method Embodiment which will not be further described here.

The monitoring module 702 in the touch unlocking apparatus 70 provided in this embodiment may specifically include a determining unit 712 and a monitoring unit 722.

The determining unit 712 is configured to determine whether the at least two touch points are located in the at least two touch areas respectively according to the obtained position information of touch points.

The monitoring unit 722 is configured to: when the at least two touch points are located in the at least two touch areas on the device screen respectively, monitor, with the sliding of the at least two touch points, the value for reflecting the change of the distance between touch points of the at least two touch points.

Further, the monitoring unit 722 in this embodiment may include a first calculating subunit 7221, a second calculating subunit 7222, and an obtaining subunit 7223.

The first calculating subunit 7221 is configured to: when the at least two touch points are located in at least two touch areas on the device screen respectively, calculate a value for reflecting an initial distance between a first touch point and a second touch point of the at least two touch points.

The second calculating subunit 7222 is configured to calculate, with the sliding of the at least two touch points, a value for reflecting a current distance between the first touch point and the second touch point of the at least two touch points, where the first touch point and the second touch point are touch points located in any two different touch areas of the at least two touch areas respectively.

The obtaining subunit 7223 is configured to obtain the value for reflecting the change of the distance between the first touch point and the second touch point according to the value for reflecting the current distance between the first touch point and the second touch point and the value for reflecting the initial distance between the first touch point and the second touch point.

The unlocking control module 703 is specifically configured to unlock the device screen when the value for reflecting the change of the distance between the first touch point and the second touch point reaches the distance change threshold.

As shown in FIG. 8, if the at least two touch areas displayed on the lock area are generated dynamically, the touch unlocking apparatus provided in this embodiment further includes an area managing module 704 based on the apparatus shown in FIG. 7. The area managing module 704 is configured to draw and generate the at least two touch areas according to an area design policy, where the at least two touch areas are displayed in the lock area on the device screen and the display positions of the at least two touch areas are updated according to the sliding positions of the at least two touch points. It should be understood that the at least two touch areas displayed on the lock area may also be preconfigured.

As seen from the above description, this embodiment provides a touch unlocking apparatus, which obtains the position information of at least two touch points on the device screen in response to sliding of a touch medium on the device screen, and when the at least two touch points are located in at least two touch areas on the device screen respectively, monitors the value for reflecting the change of the distance between the touch points of the at least two touch points, and performs unlocking control on the device screen according to the result of comparison between the value for reflecting the change of the distance between the touch points and the distance change threshold. This embodiment overcomes the unintended unlocking easily caused by the adoption of single point touch in the prior art, somehow reduces the probability of unintended unlocking of a device, and makes the unlocking operation more convenient, more visual, and more interesting.

Compared with the unlocking by sliding along a preset trail in the prior art, the embodiment of the present invention can implement unlocking by sliding along any trail in any direction; compared with the single point touch unlocking and restricted destination area of sliding in the prior art, in the embodiment of the present invention, unlocking is only activated by the simultaneous functioning of multiple points and the destination of sliding is not restricted to a fixed area or direction.

Figure 9:
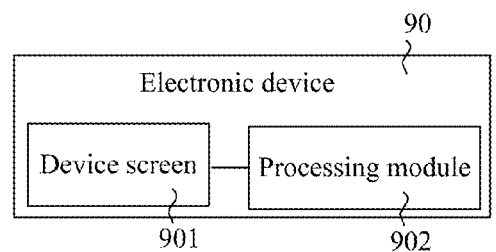
FIG. 9 is a schematic structural diagram of an electronic device according to Embodiment 1 of the present invention.

FIG. 9 is a schematic structural diagram of an electronic device in Embodiment 1 of the present invention. As shown in FIG. 9, this embodiment provides an electronic device which may specifically be a portable, compact, handheld, computer embedded, or vehicle mounted touch screen-equipped device. For example, it is specifically a mobile phone, a tablet computer, a notebook computer, a Personal Digital Assistant (PDA for short), or a GPRS navigation device. It should be understood that the electronic device in the embodiment of the present invention includes a touch screen component.

Specifically, the electronic device 90 in this embodiment includes a device screen 901 and a processing module 902, where the processing module 902 and the device screen 901 are connected.

The device screen 901 is configured to display a screen state of the electronic device before the unlocking, a screen state of the electronic device during the unlocking, or a screen state of the electronic device after the unlocking, where the screen state of the electronic device before the unlocking includes at least two touch areas displayed in the lock area on the device screen 901. The device screen 901 is also configured to sense the sliding of a touch medium at the touch points on the device screen and send a response signal to the processing module 902.

The processing module 902 is configured to receive the response signal sent by the device screen 901, obtain position information of touch points on the device screen 901 according to the response signal, where the number of touch points is at least two, and when the at least two touch points are located in at least two touch areas on the device screen 901 respectively, monitor the value for reflecting the change of the distance between the touch points of the at least two touch points, and perform unlocking control on the device screen 901 according to a result of a comparison between the the value for reflecting the change of the distance between the touch points and a distance change threshold.

To help the user unlock the device screen, related unlocking prompt information may be displayed in the positions of the preset multiple touch areas. The unlocking prompt information may be presented in form of text, image, video, or flash, or any combination thereof.

Accordingly, the device screen 901 is further configured to display related unlocking prompt information in the positions of the preset at least two touch areas, where the unlocking prompt information may be presented in form of text, image, video, or flash, or any combination thereof.

Specifically, the processing module 902 in this embodiment is configured to receive the response signal sent by the device screen 901, obtain position information of touch points on the device screen 901 according to the response signal, where the number of touch points is at least two, determine whether the at least two touch points are located in the at least two touch areas respectively according to the obtained position information of touch points, and when the at least two touch points are located in the at least two touch areas on the device screen 901 respectively, monitor, with the sliding of the at least two touch points, the value for reflecting the change of the distance between touch points of the at least two touch points and perform unlocking control on the device screen 901 according to a result of a comparison between the value for reflecting the change of the distance between the touch points and the distance change threshold.

More specifically, the processing module 902 is configured to receive the response signal sent by the device screen, obtain position information of touch points on the device screen 901 according to the response signal, where the number of touch points is at least two, determine whether the at least two touch points are located in the at least two touch areas respectively according to the obtained position information of touch points, when the at least two touch points are located in at least two touch areas on the device screen 901 respectively, calculate a value for reflecting an initial distance between a first touch point and a second touch point of the at least two touch points, calculate, with the sliding of the at least two touch points, a value for reflecting a current distance between the first touch point and the second touch point of the at least two touch points, where the first touch point and the second touch point are touch points located in any two different touch areas of the at least two touch areas, obtain the value for reflecting the change of the distance between the first touch point and the second touch point according to the value for reflecting the current distance between the first touch point and the second touch point and the value for reflecting the initial distance between the first touch point and the second touch point, and when the value for reflecting the change of the distance between the first touch point and the second touch point reaches the distance change threshold, unlock the device screen 901.

Further, in this embodiment, if the at least two touch areas displayed on the lock area are generated dynamically, the processing module 902 is also configured to draw and generate the at least two touch areas according to an area design policy, where the at least two touch areas are displayed in the lock area on the device screen, and update the display positions of the at least two touch areas according to the sliding positions of the at least two touch points.

As seen from the above description, this embodiment provides an electronic device, which obtains the position information of two touch points on the device screen in response to sliding of a touch medium on the device screen, and when at least two touch points are located in at least two touch areas on the device screen respectively, monitors the value for reflecting the change of the distance between the touch points of the at least two touch points and performs unlocking control on the device screen according to the result of comparison between the value for reflecting the change of the distance between the touch points and the distance change threshold. This embodiment overcomes the unintended unlocking easily caused by the adoption of single point touch in the prior art, somehow reduces the probability of unintended unlocking of a device, and makes the unlocking operation more convenient, more visual, and more interesting.

Compared with the unlocking by sliding along a preset trail in the prior art, the embodiment of the present invention can implement unlocking by sliding along any trail in any direction; compared with the single point touch unlocking and restricted destination area of sliding in the prior art, in the embodiment of the present invention, unlocking is only activated by the simultaneous functioning of multiple points and the destination of sliding is not restricted to a fixed area or direction.

Figure 10:
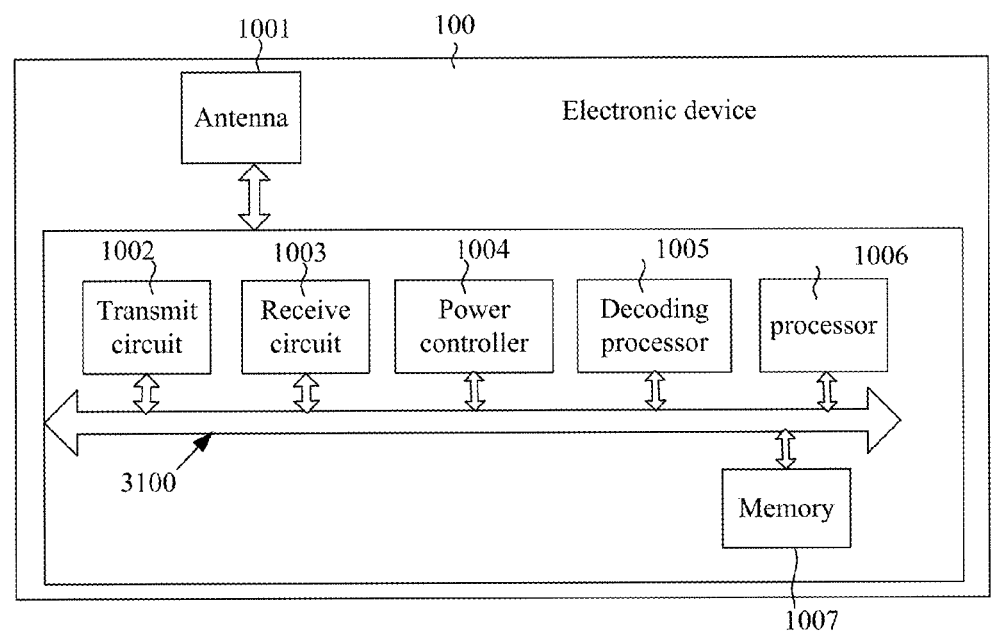
FIG. 10 is a schematic structural diagram of an electronic device according to Embodiment 2 of the present invention.

FIG. 10 is a schematic structural diagram of an electronic device in Embodiment 2 of the present invention and illustrates a specific embodiment of the electronic device, where the electronic device 100 includes a transmit circuit 1002, a receive circuit 1003, a power controller 1004, a processor 1006, a memory 1007, and an antenna 1001. The processor 1006 controls operations of the electronic device 100. The memory 1007 may include a read-only memory and a random access memory and provide instructions and data to the processor 1006. A part of the memory 1007 may include a non-volatile random access memory (NVRAM). In specific application, the electronic device 100 may be embedded in or be a wireless communication device such as a mobile phone and may include a carrier that contains the transmit circuit 1002 and the receive circuit 1003, to allow data transmission and reception between the electronic device 100 and a remote position. The transmit circuit 1002 and the receive circuit 1003 may be coupled to the antenna 1001. The components of the electronic device 100 are coupled through a bus system 3100 which includes a power bus, a control bus, and a state signal bus in addition to a data bus. For clear description, all types of buses are marked as the bus system 3100 in the figure. The electronic device 100 may further include a decoding processor 1005.

The method disclosed in the foregoing embodiments of the present invention may be applied to the processor 1006, or in another word, be implemented by the processor 1006. The electronic device in the foregoing embodiments of the present invention may specifically be implemented by the electronic device shown in FIG. 10. The processing module of the foregoing electronic device may be understood as the processor 1006 of the electronic device shown in FIG. 10. The processor 1006 may be an integrated circuit chip which can execute instructions and data and process signals. In an implementation process, the steps in the foregoing method may be completed by the integrated logic circuit of hardware or by instructions in form of software in the processor 1006. The processor may be a central processing unit (CPU), a digital signal processor (DSP), an application-specific integrated circuit (ASIC), a field programmable gate array (FPGA) or other programmable logic devices, a separated gate or a transistor logic device, or a separated hardware component. The processor can implement or execute the methods, steps, and logic block diagrams disclosed in the embodiments of the present invention. The central processing unit may be a microprocessor or the processor may be any regular processor. The steps of the methods disclosed in the embodiments of the present invention may be directly implemented by a hardware processor or completed by jointly by the hardware and software modules in the processor. The software module may be located in a storage medium mature in the field of a random memory, a flash memory, a read-only memory, a programmable read-only memory, or an electrically erasable programmable memory, or a register. The storage medium is located in the memory 1007. The processor reads information from the memory 1007 and completes the steps of the foregoing methods with its hardware.

Finally, it should be noted that the foregoing embodiments are merely intended for describing the technical solutions of the present invention, other than limiting the present invention. Although the present invention is described in detail with reference to the foregoing embodiments, persons of ordinary skill in the art should understand that they may still make modifications to the technical solutions described in the foregoing embodiments, or make equivalent replacements to some or all the technical features in the foregoing embodiments, without departing from the scope of the technical solutions of the embodiments of the present invention.

What is claimed is:

1. A method for unlocking an electronic device, wherein the device comprises a touch-sensitive screen unit that is sensitive to touch when the device is in a locked state, the method comprising:
    monitoring a first distance and a second distance on the screen unit; and
    unlocking the device when a difference between the first distance and the second distance reaches or exceeds a distance change threshold;
    wherein the first distance is a distance between a starting point of a first sliding movement of a first touch medium and a starting point of a second sliding movement of a second touch medium, and the second distance is a distance between an end point of the first sliding movement of the first touch medium and an end point of the second sliding movement of the second touch medium;
    wherein the first touch medium and the second touch medium are moving at substantially the same time; and
    wherein the first sliding movement and the second sliding movement are in substantially opposite directions.

2. The method according to claim 1, further comprising:
    displaying a first touch area and a second touch area on the screen unit according to an area design policy, wherein the starting point of the first sliding movement of the first touch medium is substantially in the first touch area and the starting point of the second sliding movement of the second touch medium is substantially in the second touch area; and
    updating display positions of the first and second touch areas according to sliding movements of the first touch medium and the second touch medium.

3. A touch-sensitive screen assembly for use in an electronic device, comprising:
    a touch screen comprising a surface and a plurality of sensing circuits for detecting a sliding movement of a touch medium on the surface and converting the sliding movement into electrical signals, wherein the touch screen is sensitive to touch in a locked state; and
    a processing circuit coupled to the touch screen, configured to monitor a first distance and a second distance on the touch screen, and unlock the device when a difference between the first distance and the second distance reaches or exceeds a distance change threshold;
    wherein the first distance is a distance between a starting point of a first sliding movement of a first touch medium and a starting point of a second sliding movement of a second touch medium, and the second distance is a distance between an end point of the first sliding movement of the first touch medium and an end point of the second sliding movement of the second touch medium;
    wherein the first touch medium and the second touch medium are moving at substantially the same time; and
    wherein the first sliding movement and the second sliding movement are in substantially opposite directions.

4. The touch-sensitive screen assembly of claim 3, wherein the touch screen further comprise a plurality of displaying circuits, which are configured to display a first touch area and a second touch area according to an area design policy, wherein the starting point of the first sliding movement of the first touch medium is substantially in the first touch area and the starting point of the second sliding movement of the second touch medium is substantially in the second touch area, and configured to update display positions of the first and second touch areas according to sliding movements of the first touch medium and the second touch medium.

5. An electronic device, comprising:
    a touch-sensitive screen unit;
    one or more processors; and
    a memory,
    wherein a program is stored in the memory for execution by the one or more processors when the device is in a locked state, the program comprises instructions for:
    monitoring a first distance and a second distance on the screen unit; and
    unlocking the device when a difference between the first distance and the second distance reaches or exceeds a distance change threshold;
    wherein the first distance is a distance between a starting point of a first sliding movement of a first touch medium and a starting point of a second sliding movement of a second touch medium, and the second distance is a distance between an end point of the first sliding movement of the first touch medium and an end point of the second sliding movement of the second touch medium;
    wherein the first touch medium and the second touch medium are moving at substantially the same time; and
    wherein the first sliding movement and the second sliding movement are in substantially opposite directions.

6. The electronic device according to claim 5, wherein the program further comprises instructions for:
    displaying a first touch area and a second touch area on the screen unit according to an area design policy, wherein the starting point of the first sliding movement of the first touch medium is substantially in the first touch area and the starting point of the second sliding movement of the second touch medium is substantially in the second touch area; and
    updating display positions of the first and second touch areas according to movements of the first touch medium and the second touch medium.

7. A non-transitory computer readable storage medium storing a program for execution by a processor in an electronic device, wherein the device comprises a touch-sensitive screen unit sensitive to touch when the device is in a locked state, and the program comprises instructions for:
    monitoring a first distance and a second distance on the screen unit; and
    unlocking the device when a difference between the first distance and the second distance reaches or exceeds a distance change threshold;
    wherein the first distance is a distance between a starting point of a first sliding movement of a first touch medium and a starting point of a second sliding movement of a second touch medium, and the second distance is a distance between an end point of the first sliding movement of the first touch medium and an end point of the second sliding movement of the second touch medium;
    wherein the first touch medium and the second touch medium are moving at substantially the same time; and wherein the first sliding movement and the second sliding movement are in substantially opposite directions.

8. The non-transitory computer readable storage medium according to claim 7, wherein the program further comprises instructions for:
displaying a first touch area and a second touch area on the screen unit according to an area design policy, wherein the starting point of the first sliding movement of the first touch medium is substantially in the first touch area and the starting point of the second sliding movement of the second touch medium is substantially in the second touch area; and
updating display positions of the first and second touch areas according to sliding movements of the first touch medium and the second touch medium.

9. A method for unlocking a touch-sensitive screen unit of a device, wherein the screen unit in a locked state has a lock area, and the lock area comprises a surface that includes a first touch area and a second touch area, the method comprising:
detecting a first sliding movement of a touch medium on the first touch area and a second sliding movement of a touch medium on the second touch area;
determining whether to unlock the screen unit based on a difference between a first distance and a second distance, wherein the first distance is a distance between a start point of the first sliding movement and a start point of the second sliding movement, and the second distance is a distance between an end point of the first sliding movement and an end point of the second sliding movement; and
unlocking the screen unit when the difference between the first distance and the second distance is greater than or equal to a distance change threshold.

10. An electronic device, comprising:
a touch-sensitive screen unit, wherein the screen unit in a locked state has a lock area, and the lock area comprises a surface that includes a first touch area and a second touch area;
one or more processors; and
a memory, wherein a program is stored in the memory and configured to be executed by the one or more processors, and the program comprises instructions for:
detecting a first sliding movement of a touch medium on a first touch area and a second sliding movement of a touch medium on a second touch area;
determining whether to unlock the screen unit based on a difference between a first distance and a second distance, wherein the first distance is a distance between a start point of the first sliding movement and a start point of the second sliding movement, and the second distance is a distance between an end point of the first sliding movement and an end point of the second sliding movement; and
unlocking the screen unit when the difference between the first distance and the second distance is greater than or equal to a distance change threshold.

11. A non-transitory computer readable storage medium storing one or more programs for execution by a processor in an electronic device that comprises a touch-sensitive screen unit which, in a locked state, has a lock area comprising a surface that includes a first touch area and a second touch area, the programs comprise instructions for:
detecting a first sliding movement of a touch medium on the first touch area and a second sliding movement of a touch medium on the second touch area;
determining whether to unlock the screen unit based on a difference between a first distance and a second distance, wherein the first distance is a distance between a start point of the first sliding movement and a start point of the second sliding movement, and the second distance is a distance between an end point of the first sliding movement and an end point of the second sliding movement; and
unlocking the screen unit when the difference between the first distance and the second distance is greater than or equal to a distance change threshold.

* * * * *